US012765568B2

(12) United States Patent
Kitamura et al.

(10) Patent No.: US 12,765,568 B2
(45) Date of Patent: Oct. 20, 2026

(54) METHOD FOR PRODUCING FROZEN PROCESSED COOKED RICE FOOD

(71) Applicant: NICHIREI FOODS INC., Tokyo-to (JP)

(72) Inventors: Jiro Kitamura, Tokyo-to (JP); Akiko Sawada, Tokyo-to (JP); Masao Sawada, Tokyo-to (JP); Masaru Sekiguchi, Tokyo-to (JP)

(73) Assignee: NICHIREI FOODS INC., Tokyo-to (JP)

( * ) Notice: Subject to any disclaimer, the term of this patent is extended or adjusted under 35 U.S.C. 154(b) by 508 days.

(21) Appl. No.: 18/285,169

(22) PCT Filed: Mar. 24, 2022

(86) PCT No.: PCT/JP2022/014189

§ 371 (c)(1),
(2) Date: Sep. 29, 2023

(87) PCT Pub. No.: WO2022/210311

PCT Pub. Date: Oct. 6, 2022

(65) Prior Publication Data

US 2024/0349761 A1 Oct. 24, 2024

(30) Foreign Application Priority Data

Mar. 31, 2021 (JP) ................................ 2021-062147

(51) Int. Cl.
*A23B 2/80* (2025.01)
*A23L 5/10* (2016.01)
*A23L 7/196* (2016.01)

(52) U.S. Cl.
CPC .................. *A23B 2/80* (2025.01); *A23L 5/13* (2016.08); *A23L 7/196* (2016.08)

(58) Field of Classification Search
CPC .............. A23B 2/80; A23L 7/196; A23L 5/13
USPC .......................................................... 426/444
See application file for complete search history.

(56) References Cited

FOREIGN PATENT DOCUMENTS

| | | | | |
|---|---|---|---|---|
| JP | 51-101149 | A | | 9/1976 |
| JP | 3-254651 | A | | 11/1991 |
| JP | 5-68492 | A | | 3/1993 |
| JP | H0568492 | A | * | 3/1993 |
| JP | 5-261021 | A | | 10/1993 |
| JP | 2000-139376 | A | | 5/2000 |
| JP | 2005-192475 | A | | 7/2005 |
| JP | 2013-247932 | A | | 12/2013 |
| JP | 2018-110537 | A | | 7/2018 |

OTHER PUBLICATIONS

International Search Report for PCT/JP2022/014189 (PCT/ISA/210) mailed on Jun. 7, 2022.
Written Opinion of the International Searching Authority for PCT/JP2022/014189 (PCT/ISA/237) mailed on Jun. 7, 2022.
International Preliminary Report on Patentability and English translation of the Written Opinion of the International Searching Authority for International Application No. PCT/JP2022/014189, dated Oct. 12, 2023.

* cited by examiner

*Primary Examiner* — Brent T O'Hern
(74) *Attorney, Agent, or Firm* — Birch, Stewart, Kolasch & Birch, LLP

(57) ABSTRACT

A method for producing a frozen processed cooked rice food is disclosed. This method includes: (A) a step of obtaining processed cooked rice food, wherein the step includes seasoning and/or processing before or after cooking raw material rice; (B) a step of cooling the surface of the processed cooked rice food obtained in step (A) to a temperature in the range of −1 to 45° C.; (C) a step of loosening the processed cooked rice food while bringing steam into contact with the processed cooked rice food cooled in step (B) to attach water to the processed cooked rice food in an amount of 2 to 10 mass % with respect to the mass of the processed cooked rice food; and (D) a step of freezing the processed cooked rice food obtained in step (C).

9 Claims, No Drawings

METHOD FOR PRODUCING FROZEN PROCESSED COOKED RICE FOOD

CROSS REFERENCE TO RELATED APPLICATIONS

The present patent application claims priority based on Japanese Patent Application No. 2021-062147 (filing date: Mar. 31, 2021). The whole disclosures of the earlier patent application are hereby incorporated by reference as a part of this description.

TECHNICAL FIELD

The present disclosure relates to a method for producing frozen processed cooked rice food.

BACKGROUND ART

Traditional methods for freezing processed cooked rice food have been adopting a method of making the food easily separable by using additives, oils and fats, etc. for the purpose other than seasoning; dropping and spreading the food on a conveyor; and then applying physical force to the food for separate freezing. Specifically, as an example, before freezing, the rice is leveled on a conveyer, and after freezing, the rice is cracked with stirring teeth or the like to separate the rice grains one by one. However, even though this method separates the rice grains, the rice grains are crushed and cracked to be tattered, which has demerits of causing deterioration in quality such as appearance and texture. In addition, the use of additives and oils and fats that are essentially unnecessary for the seasoning may adversely affect the taste and flavor of cooked rice.

Therefore, the development of a method for separate freezing of frozen processed cooked rice food is underway, which uses neither additives nor fats and oils and is different from the method of physically breaking and separating into pieces.

For example, in PTL 1, disclosed is separated frozen cooked rice which has no damage on rice grain particles, is oil and fat free, and has a satisfactory texture, and a method for producing the same.

However, there is still a demand for a frozen processed cooked rice food and a method for producing the same that can achieve separate freezing in a more satisfactory condition without using additives or fats and oils when the processed cooked rice food is produced and then frozen.

CITATION LIST

Patent Literature

[PTL 1] Japanese Unexamined Patent Application Publication No. 1993-68492

SUMMARY OF INVENTION

The present disclosure provides a frozen processed cooked rice food which has an improved state of separating when the processed cooked rice food is produced and then frozen, and a method for producing the same.

The present disclosers have found a method for producing frozen processed cooked rice food, comprising: (A) a step of obtaining processed cooked rice food, wherein the step includes seasoning and/or processing before or after cooking raw material rice; (B) a step of cooling the surface of the processed cooked rice food obtained in step (A) to a temperature in the range of −1 to 45° C.; (C) a step of loosening the processed cooked rice food while bringing steam into contact with the processed cooked rice food cooled in step (B) to attach water to the processed cooked rice food in an amount of 2 to 10 mass % with respect to the mass of the processed cooked rice food; and (D) a step of freezing the processed cooked rice food obtained in step (C).

In accordance with the present disclosure, there are provided a frozen processed cooked rice food which has an improved state of separating when the processed cooked rice food is produced and then frozen, and a method for producing the same. In addition, the present disclosure enables satisfactory separate freezing even if additives such as emulsified oils and fats are not used or used in a reduced amount, which is an advantageous point.

DESCRIPTION OF EMBODIMENTS

According to one embodiment of the present disclosure, a method for producing frozen processed cooked rice food comprises: (A) a step of obtaining processed cooked rice food, wherein the step includes seasoning and/or processing before or after cooking raw material rice; (B) a step of cooling the surface of the processed cooked rice food obtained in step (A) to a temperature in the range of −1 to 45° C.; (C) a step of loosening the processed cooked rice food while bringing steam into contact with the processed cooked rice food cooled in step (B) to attach water to the processed cooked rice food in an amount of 2 to 10 mass % with respect to the mass of the processed cooked rice food; and (D) a step of freezing the processed cooked rice food obtained in step (C). The method of the present disclosure enables appropriate separation without using additives or fats and oils, and thus enables the frozen processed cooked rice food to maintain the original taste and flavor of the cooked rice. In addition, the method of the present disclosure enables the frozen processed cooked rice food to reduce physical damage to the cooked rice, which is unlikely to be flawed, and thus enables the processed cooked rice food to maintain a clean appearance. Further, the method of the present disclosure enables the cooked rice of the frozen processed cooked rice food to have appropriate stickiness and elasticity to exhibit a plump texture, and thus to maintain the deliciousness of the cooked rice as it is, which is another advantage of the method of the present disclosure.

In the present disclosure, the processed cooked rice food refers to a food using rice as main raw material and prepared by seasoning and/or processing the raw material rice before or after cooking. In the present disclosure, a processed cooked rice food includes raw materials other than raw material rice. Examples of the processed cooked rice food include fried rice, pilaf, dry curry, chicken rice, butter rice, bibimbap, jambalaya, nasi goreng, takikomi gohan, sushi rice, chirashi-zushi, red rice, etc., and preferably in particular fried rice, pilaf, chicken rice, takikomi gohan, and red rice.

In the present disclosure, seasoning refers to seasoning, flavoring, etc. to make the processed cooked rice food easy to eat. In addition, processing refers to subjecting the raw material rice or cooked rice, etc. to a physical, chemical, or biological treatment to make it suitable for a processed cooked rice food or production of a processed cooked rice food, and examples thereof include frying with a frying device etc., baking in an oven etc., mixing materials, and the like.

In the present disclosure, rice as raw material (raw material rice) refers to rice after threshing or removing rice husks, and before being immersed in water. The raw material rice is not particularly limited as long as it is used as a raw material for processed cooked rice food, and variety of rice, presence or absence of milling, degree of polishing, and the like can be appropriately selected depending on the desired type of processed cooked rice food. There can be used rice varieties, such as Japonica rice and Indica rice, and either non-glutinous rice or glutinous rice can be used. Further, there can be used any of the followings: rice before milling (so-called brown rice), rice with germs left (so-called germ rice), and rice after milling (so-called polished rice). Further, the raw material rice may be mixed with grains other than rice as long as the effect of the present invention is not impaired. Examples of grains other than rice include wheat, barley (such as rolled barley, barley rice grain, glutinous barley, etc.), adlay, foxtail millet, Japanese millet, millet, black sesame, and white sesame.

The raw material rice is subjected to pretreatment, such as washing and immersing, as necessary, before the heat cooking step. For example, raw material rice is washed with water, immersed in water for 1 hour or more, drained, and then subjected to heat cooking such as rice cooking. In the present disclosure, "cooking rice" may include not only heat cooking by rice cooking (cooking in a cooker), but also cooking by a steamer (household use), a rice steaming apparatus (industrial use), or the like.

Cooking of raw material rice is carried out according to a conventional method, and is carried out by heating the raw material rice in a state of being immersed in water.

The device for cooking raw material rice is not particularly limited the effect of the present disclosure is exhibited, and a well-known rice cooking device for either industrial use or home use can be used.

The processed cooked rice food of the present disclosure can be seasoned and/or processed before and/or after cooking rice and then completed. Such a process of producing a processed cooked rice food is appropriately determined by those skilled in the art depending on the desired processed cooked rice food.

In the production method of the present disclosure, the surface of the processed cooked rice food after production is cooled to a temperature in the range of −1 to 45° C. The cooling temperature is not particularly limited as long as in the range of −1 to 45° C., and preferably in the range of −1 to 25° C.

In the production method of the present disclosure, 2 to 10 mass % of water with respect to the mass of the processed cooked rice food is attached to the processed cooked rice food by bringing steam into contact with the cooled processed cooked rice food. The mass ratio of water to be attached is not particularly limited as long as in the range of 2 to 10 mass %, and preferably in the range of 2 to 6 mass %.

In the production method of the present disclosure, "steam" is not particularly limited as long as the effects of the present disclosure are exhibited, and is preferably water vapor.

The above mass ratio of water refers to the mass ratio of water actually attached to the cooled processed cooked rice food. For example, though not limited thereto, when 5 g of water attaches to 100 g of cooled processed cooked rice food to make 105 g of cooled processed rice food, the mass ratio of water with respect to the mass of processed cooked rice food is 5 mass %.

In the production method of the present disclosure, the "step of loosening the processed cooked rice while bringing steam into contact" is not particularly limited as long as the effect of the present disclosure is exhibited, and is a step of generating dew condensation on the surface of the cooked rice grains and materials of the cooled processed cooked rice by bringing steam into contact and loosening the processed cooked rice while maintaining the dew-condensed state, and preferably, for example, a step of loosening the cooked rice while spraying steam.

The pressure for spraying the steam may be adjusted within a range that allows the specified amount of steam to attach to the surface of the cooled processed cooked rice food, and, for example, though not limited thereto, is in the range of 0.1 to 0.5 MPa.

The difference between the surface temperature of the cooled processed cooked rice food and the temperature of the sprayed steam is not limited, and is preferably, for example, in the range of 55 to 101° C.

In the production method of the present disclosure, the "step of loosening the processed cooked rice" is not particularly limited as long as the effect of the present disclosure is exhibited, and examples thereof include a step of loosening the processed cooked rice by bringing stirring sticks, comb teeth, rotary teeth, or the like into physical contact with the processed cooked rice; a step of loosening the processed cooked rice by vibration of a vibration conveyor or the like; a step of loosening the processed cooked rice while being stirred by rotation in a rotating container; a step of loosening the processed cooked rice by a fall at a connection between two conveyors or the like; a step of loosening processed cooked rice by applying pressure with air; and the like. The above steps may be performed singly or in combination. In the production method of the present disclosure, the "step of loosening the processed cooked rice" include neither a step of kneading the processed cooked rice nor a step of crushing the processed cooked rice. In addition, in the production method of the present disclosure, physical parameters such as frequency of vibration, number of rotations, air pressure, etc. may be adjusted within a range that enables separate freezing. In the production method of the present disclosure, the "step of loosening the processed cooked rice" is preferably one or more steps selected from following steps: a step of loosening the processed cooked rice with a spatula, a stick, and/or comb teeth equipped with a stirring mechanism and/or a rotating mechanism; a step of loosening the processed cooked rice with a conveying device equipped with a vibrating mechanism; a step of loosening the processed cooked rice by a fall at a connection to a succeeding conveying device during transfer by the conveying devices; and a step of loosening the processed cooked rice by air pressure.

In the production method of the present disclosure, the "step of loosening the processed cooked rice" is not particularly limited as long as the effect of the present disclosure is exhibited, and is preferably a step of loosening the processed cooked rice after spreading or while spreading the processed cooked rice to be 100 g per space of area (100 to 300 $cm^2$)xheight (0.1 to 3.0 cm).

In the production method of the present disclosure, a specified amount of steam is brought into contact with the cooled processed cooked rice to cause dew condensation on the surface of the cooled processed cooked rice, the processed cooked rice is loosened while maintaining the dew-condensed state, and the resulting processed cooked rice is frozen. As a result, the processed cooked rice forms multiple-grain agglomerates in which a single grain of cooked rice and a plurality of cooked rice grains are connected to each other, and can be frozen in the form of such multiple-grain agglomerate.

In order to maintain the neat appearance of a processed cooked rice food, in the producing method of the present disclosure, the long axis of the multiple-grain agglomerate may be appropriately selected in a preferable range in consideration of variety of rice, presence or absence of milling, degree of polishing, etc. of the raw material rice for the desired processed cooked rice food, and is preferably 25 mm or less, and further preferably 20 mm or less. When a raw material other than rice is contained in the multiple-grain agglomerate, the long axis of the multiple-grain agglomerate refers to the length of only the cooked rice portion of the multiple-grain agglomerate. That is, when a raw material other than cooked rice protrudes from the surface of multiple-grain agglomerate, the long axis of multiple-grain agglomerate does not include the length occupied by the raw material other than cooked rice along the long axis.

In the production method of the present disclosure, well-known methods can be used as a method for freezing the processed cooked rice food, and the method can be appropriately selected depending on the type of the processed cooked rice food. Preferably, the processed cooked rice food can be obtained in a frozen food form by rapidly freezing at −30° C. or lower. Further, the obtained frozen food is stored at −15° C. or lower, preferably −18° C. or lower.

The frozen processed cooked rice food of the present disclosure can be served as a meal through various heat treatments using a microwave oven, a frying pan, a hot water bath, and the like.

Further, according to an embodiment of the present disclosure, the following (1) to (10) can be provided.

(1) A method for producing a frozen processed cooked rice food, comprising:

(A) a step of obtaining processed cooked rice food, wherein the step includes seasoning and/or processing before or after cooking raw material rice;

(B) a step of cooling the surface of the processed cooked rice food obtained in step (A) to a temperature in the range of −1 to 45° C.;

(C) a step of loosening the processed cooked rice food while bringing steam into contact with the processed cooked rice food cooled in step (B) to attach water to the processed cooked rice food in an amount of 2 to 10 mass % with respect to the mass of the processed cooked rice food; and (D) a step of freezing the processed cooked rice food obtained in step (C).

(2) The method according to (1), wherein the processed cooked rice food is selected from takikomi gohan, fried rice, pilaf, chicken rice, dry curry, and red rice.

(3) The method according to (1) or (2), wherein the temperature for cooling the surface of the processed cooked rice food in step (B) is within the range of −1 to 25° C.

(4) The method according to any one of (1) to (3), wherein the steam brought into contact in step (C) is water vapor.

(5) The method according to any one of (1) to (4), wherein the step of loosening the processed cooked rice in step (C) is one or more steps selected from following steps: a step of loosening the processed cooked rice with a spatula, a stick, and/or comb teeth equipped with a stirring mechanism and/or a rotating mechanism; a step of loosening the processed cooked rice with a conveying device equipped with a vibrating mechanism; a step of loosening the processed cooked rice by a fall at a connection to a succeeding conveying device during transfer by the conveying devices; and a step of loosening the processed cooked rice by air pressure.

(6) The method according to any one of (1) to (5), wherein the step of loosening the processed cooked rice while bringing steam into contact in step (C) is a step of loosening the processed cooked rice while spraying steam.

(7) The method according to any one of (1) to (6), wherein the step of loosening the processed cooked rice in step (C) is a step of loosening the processed cooked rice after spreading or while spreading the processed cooked rice to be 100 g per space of area (100 to 300 $cm^2$)×height (0.1 to 3.0 cm).

(8) The method according to any one of (1) to (7), wherein the mass ratio of water attached to the processed cooked rice in step (C) is 2 to 6 mass % with respect to the mass of the processed cooked rice food.

(9) The method according to any one of (1) to (8), wherein the processed cooked rice food frozen in step (D) is in a form of multiple-grain agglomerates in which a single grain of cooked rice and a plurality of cooked rice grains are connected to each other, and the multiple-grain agglomerate has a long axis of 25 mm or less.

(10) The method according to (9), wherein the processed cooked rice food frozen in step (D) is in a form of multiple-grain agglomerates in which a single grain of cooked rice and a plurality of cooked rice grains are connected to each other, and the multiple-grain agglomerate has a long axis of 20 mm or less.

EXAMPLES

Hereinafter, the present disclosure will be specifically described, but the present disclosure is not limited to these examples. Unless otherwise specified, units and measurement methods conform to Japanese Industrial Standards (JIS).

Takikomi gohan was prepared according to the procedure shown below. Polished rice (450 g) was prepared, washed by normal operation, immersed in water for 1 hour or more, with addition of water to the total amount of 1035 g with polished rice and water, and mixed with dashi solution (32 g) ("Gomoku Kamameshi no Moto" Yamamori Inc.). The ingredients for Kamameshi ("Gomoku Kamameshi no Moto" manufactured by Yamamori Inc.) were added thereto, and the mixture was cooked in an IH rice cooker and subjected to the test. The cooked takikomi gohan (300 g) was spread on a mesh (inside diameter: 2 mm, gridded) to about 600 $cm^2$ (about 1.5-cm thick), cooled in a refrigerator to −3 to 55° C. or lower, and was loosened by breaking vertically with a rubber spatula while being sprayed with steam (1 to 10 mass %) by using a steam cleaner SC4 EasyFix (max. discharge pressure: 0.35 MPa, sprayed steam rate: about 1.1 g/sec) (manufactured by Karcher). At this step, while the moisture of the steam was spread among the rice grains, the rice grains were loosened with a rubber spatula so as not to crush the rice grain. After that, the takikomi gohan was transferred to a vat and subjected to rapid freeze/refrigeration. The frozen rice (150 g) was placed in a rice bowl, lightly covered with wrap film, heated in a microwave oven at 600 W for 2 minutes, and then good or bad of the separated state was evaluated.

Fried rice was prepared by the procedure shown below. Polished rice (600 g) was prepared, washed by normal operation, immersed in water for 1 hour or more, with addition of water to the total amount of 1350 g with polished rice and water, and cooked with an IH rice cooker. Two bags of fried rice mix and two eggs were used for 500 g of cooked rice. In accordance with the cooking instructions, fried rice was prepared by oiling a frying pan, stir-frying the eggs, and then adding the rice and fried rice mix ("Grilled pork fried rice mix" manufactured by Nagatanien Co., Ltd.), and the cooked fried rice was spread on a mesh (inside diameter: 2 mm, gridded) to about 600 $cm^2$ (about 1.5-cm thick), cooled in a refrigerator to 10° C. or lower, and was loosened by breaking vertically with a rubber spatula while being sprayed with steam (4 mass %) by using a steam cleaner SC4 EasyFix (max. discharge pressure: 0.35 MPa, sprayed steam rate: about 1.1 g/sec) (manufactured by Karcher). At this step, while the moisture of the steam was spread among the rice grains, the rice grains were loosened with a rubber spatula so as not to crush the rice grain. After that, the fried rice was transferred to a vat and subjected to rapid freeze/refrigeration. The frozen fried rice (250 g) was placed on a plate, lightly covered with wrap film, heated in a microwave oven at 600 W for 3 minutes and 30 seconds, and then served as a meal.

Chicken rice was prepared by the procedure shown below. Polished rice (600 g) was prepared, washed by normal operation, immersed in water for 1 hour or more, with addition of water to the total amount of 1350 g with polished rice and water, and cooked with an IH rice cooker. Chicken rice was prepared by adding 1 bag of chicken rice mix ("Chicken rice (maze gohan mix) manufactured by Kikkoman Corporation") to the cooked rice (340 g) and mixing, and the cooked chicken rice was spread on a mesh (inside diameter: 2 mm, gridded) to about 600 $cm^2$ (about 1.5-cm thick), cooled in a refrigerator to 10° C. or lower, and was loosened by breaking vertically with a rubber spatula while being sprayed with steam (4 mass %) by using a steam cleaner SC4 EasyFix (max. discharge pressure: 0.35 MPa, sprayed steam rate: about 1.1 g/sec) (manufactured by Kärcher). At this step, while the moisture of the steam was spread among the rice grains, the rice grains were loosened with a rubber spatula so as not to crush the rice grain. After that, the chicken rice was transferred to a vat and subjected to rapid freeze/refrigeration. The frozen chicken rice (250 g) was placed on a plate, lightly covered with wrap film, heated in a microwave oven at 600 W for 3 minutes and 30 seconds, and then served as a meal.

Shrimp pilaf was prepared by the procedure shown below. Used was main ingredients: rice (450 g), onion (150 g), butter (45 g) (for stir-frying onion, rice), chicken bouillon (3 pieces), shrimp (12 with shell/headless), broccoli (200 g), green onion (60 g), butter (20 g) (for stir-frying shrimp, green onion). After stir-frying the finely chopped onion in butter, the unwashed rice was added thereto and stir-fried over medium heat for 2 minutes until the rice was translucent. Stir-fried rice and chicken soup (780 g) (as indicated, dissolved in 300 g of hot water per piece of chicken bouillon) were placed in an IH rice cooker and cooked in the normal white rice mode. Shrimp pilaf was prepared by adding to cooked rice ingredients of cut and boiled broccoli, cut shrimp and finely chopped green onion stir-fried in butter, and mixing. The prepared shrimp pilaf was spread on a mesh (inside diameter: 2 mm, gridded) to about 600 $cm^2$ (about 1.5-cm thick), cooled in a refrigerator to 10° C. or lower, and was loosened by breaking vertically with a rubber spatula while being sprayed with steam (4 mass %) by using a steam cleaner SC4 EasyFix (max. discharge pressure: 0.35 MPa, sprayed steam rate: about 1.1 g/sec) (manufactured by Kärcher). At this step, while the moisture of the steam was spread among the rice grains, the rice grains were loosened with a rubber spatula so as not to crush the rice grain. After that, the shrimp pilaf was transferred to a vat and subjected to rapid freeze/refrigeration. The frozen shrimp pilaf (250 g) was placed on a plate, lightly covered with wrap film, heated in a microwave oven at 600 W for 3 minutes and 30 seconds, and then served as a meal.

Red rice was prepared by the procedure shown below. Glutinous rice (280 g) (rinse-free rice), cooked cowpeas (40 g), broth (70 g), and water (250 g) were placed in an IH rice cooker using a commercially available red rice mix ("Sekihan Okowa Set" manufactured by Ichibiki Co., Ltd.), and red rice was immediately cooked and subjected to the test. The cooked red rice was spread on a mesh (inside diameter: 2 mm, gridded) to about 600 $cm^2$ (about 1.5-cm thick), cooled in a refrigerator to 10° C. or lower, and was loosened by breaking vertically with a rubber spatula while being sprayed with steam (4 mass %) by using a steam cleaner SC4 EasyFix (max. discharge pressure: 0.35 MPa, sprayed steam rate: about 1.1 g/sec) (manufactured by Karcher). At this step, while the moisture of the steam was spread among the rice grains, the rice grains were loosened with a rubber spatula so as not to crush the rice grain. After that, the red rice was transferred to a vat and subjected to rapid freeze. After freezing, red rice (150 g) was placed in a rice bowl, covered with wrap film, heated in a microwave oven at 600 W for 2 minutes, and then served as a meal.

For comparison, takikomi gohan, fried rice, chicken rice, shrimp pilaf, and red rice were prepared by rapid freeze/refrigeration using snowy dry-ice instead of by spraying steam. Each of these frozen processed cooked rice food (250 g) was placed on a plate, lightly covered with wrap film, heated in a microwave oven at 600 W for 3 minutes and 30 seconds, and then served as a meal.

The results are shown in Tables 1 to 4. The separated state for each processed cooked rice food using mainly non-glutinous rice as the raw material rice, excluding red rice, was determined as follows in terms of length of a long axis of multiple-grain agglomerate: good for 20 mm or less, and bad for 21 mm or more. The separated state for red rice using mainly glutinous rice as the raw material rice was determined as follows in terms of length of a long axis of multiple-grain agglomerate: good for 25 mm or less, and bad for 26 mm or more.

TABLE 1

Table 1: Evaluation results 1 (Examples 1 to 6)

| | Ex 1 | Ex 2 | Ex 3 | Ex 4 | Ex 5 | Ex 6 |
|---|---|---|---|---|---|---|
| Processed cooked rice food | | | Takikomi gohan | | | |
| Cooling temperature of cooked rice | 10° C. | 25° C. | 45° C. | −1° C. | 10° C. | 10° C. |

TABLE 1-continued

| Table 1: Evaluation results 1 (Examples 1 to 6) | Ex 1 | Ex 2 | Ex 3 | Ex 4 | Ex 5 | Ex 6 |
|---|---|---|---|---|---|---|
| Amount of steam | 4% | 4% | 4% | 4% | 2% | 3% |
| Sprayed steam temperature | 100° C. | 100° C. | 100° C. | 100° C. | 100° C. | 100° C. |
| Good or Bad of separation* | Good | Good | Good | Good | Good | Good |

Ex: Example*
Length of long axis of multiple-grain agglomerate, 20 mm or less: Good, 21 mm or more: Bad

TABLE 2

Evaluation results 2 (Examples 7 to 12)

| | Ex 7 | Ex 8 | Ex 9 | Ex 10 | Ex 11 | Ex 12 |
|---|---|---|---|---|---|---|
| Processed cooked rice food | Takikomi gohan | | | Fried rice | Chicken rice | Shrimp pilaf |
| Cooling temperature of cooked rice | 10° C. | 10° C. | 10° C. | 10° C. | 10° C. | 10° C. |
| Amount of steam | 5% | 6% | 8% | 4% | 4% | 4% |
| Sprayed steam temperature | 100° C. | 100° C. | 100° C. | 100° C. | 100° C. | 100° C. |
| Good or Bad of separation* | Good | Good | Good | Good | Good | Good |
| Remarks | | | | The cooked rice surface exhibits a crispy texture of fried rice. | The cooked rice surface does not exhibit a sticky texture but a plump texture. | The cooked rice is elastic and not too sticky, which is suitable for pilaf. |

Ex: Example
*Length of long axis of multiple-grain agglomerate, 20 mm or less: Good, 21 mm or more: Bad

TABLE 3

Evaluation results 3 (Examples 13 and 14 and Comparative examples 1 to 4)

| | Ex 13 | Ex 14 | Cex 1 | Cex 2 | Cex 3 | Cex 4 |
|---|---|---|---|---|---|---|
| Processed cooked rice food | Red rice | Takikomi gohan | | | | |
| Cooling temperature of cooked rice | 10° C. | 10° C. | −3° C. | 55° C. | 10° C. | — |
| Amount of steam | 4% | 10% | 4% | 4% | 1% | — |
| Sprayed steam temperature | 100° C. | 100° C. | 100° C. | 100° C. | 100° C. | — |
| Good or Bad of separation* | Good | Good | Bad | Bad | Bad | Bad |
| Remarks | A very glossy appearance is exhibited, and a chewy texture of rice is retained. | | | | | Snowy dry-ice freezing is performed. |

Ex: Example, Cex: Comparative example
*Length of long axis of multiple-grain agglomerate (excluding red rice), 20 mm or less: Good, 21 mm or more: Bad
*Length of long axis of multiple-grain agglomerate (red rice), 25 mm or less: Good, 26 mm or more: Bad

TABLE 4

Evaluation results 4 (Comparative examples 6 to 9)

| | Cex 6 | Cex 7 | Cex 8 | Cex 9 |
|---|---|---|---|---|
| Processed cooked rice food | Fried rice | Chicken rice | Shrimp pilaf | Red rice |
| Cooling temperature of cooked rice | — | — | — | — |
| Amount of steam | — | — | — | — |
| Sprayed steam temperature | — | — | — | — |
| Good or Bad of separation* | Bad | Bad | Bad | Bad |
| Remarks | Snowy dry-ice freezing is performed. | | | |

Cex: Comparative example
*Length of long axis of multiple-grain agglomerate (excluding red rice), 20 mm or less: Good, 21 mm or more: Bad
*Length of long axis of multiple-grain agglomerate (red rice), 25 mm or less: Good, 26 mm or more: Bad From the above, the method of the present disclosure was shown to enable satisfactory separate freezing of frozen processed cooked rice. The frozen processed cooked rice with a steam content of 11% or more exhibited unsatisfactory separated state as compared to the frozen processed cooked rice obtained by the method of the present disclosure, and after heated in a microwave oven, became soft and too sticky due to high water content, and thus could not exhibit a satisfactory texture.

The invention claimed is:

1. A method for producing a frozen processed cooked rice food, comprising:

(A) a step of obtaining processed cooked rice food, wherein the step includes seasoning and/or processing before or after cooking raw material rice;

(B) a step of cooling the surface of the processed cooked rice food obtained in the step (A) to a temperature in the range of −1 to 45° C.;

(C) a step of loosening the processed cooked rice food while bringing steam into contact with the processed cooked rice food cooled in the step (B) to attach water to a surface of the processed cooked rice food in an amount of 2 to 10 mass % with respect to the mass of the processed cooked rice food; and (D) a step of freezing the processed cooked rice food obtained in the step (C).

2. The method according to claim 1, wherein the processed cooked rice food is selected from takikomi gohan, fried rice, pilaf, chicken rice, dry curry rice, and red rice.

3. The method according to claim 1, wherein the temperature for cooling the surface of the processed cooked rice food in the step (B) is within the range of −1 to 25° C.

4. The method according to claim 1, wherein the steam brought into contact in the step (C) contains water vapor.

5. The method according to claim 1, wherein the step of loosening the processed cooked rice food in the step (C) is one or more steps selected from following steps:

a step of loosening the processed cooked rice food with a spatula, a stick, and/or comb teeth equipped with a stirring mechanism and/or a rotating mechanism;

a step of loosening the processed cooked rice food with a conveyor device equipped with a vibrating mechanism;

a step of loosening the processed cooked rice food by a fall at a connection to a succeeding conveyor device during transfer by the conveyor device(s); and a step of loosening the processed cooked rice food by air pressure.

6. The method according to claim 1, wherein the step of loosening the processed cooked rice food while bringing the steam into contact in the step (C) is a step of loosening the processed cooked rice food while spraying steam.

7. The method according to claim 1, wherein the step of loosening the processed cooked rice food in the step (C) is a step of loosening the processed cooked rice food after spreading or while spreading the processed cooked rice food to be 100 g per space of area (100 to 300 $cm^2$)×height (0.1 to 3.0 cm).

8. The method according to claim 1, wherein the mass ratio of the water attached to the processed cooked rice food in the step (C) is 2 to 6 mass % with respect to the mass of the processed cooked rice food.

9. The method according to claim 1, wherein the processed cooked rice food frozen in the step (D) is in a form of multiple-grain agglomerate in which a single grain of cooked rice and a plurality of cooked rice grains are connected to each other, and the multiple-grain agglomerate has a long axis of 25 mm or less.

* * * * *